United States Patent [19]

Sezaki et al.

[11] Patent Number: 5,081,179

[45] Date of Patent: Jan. 14, 1992

[54] THERMOPLASTIC ELASTOMER COMPOSITION

[75] Inventors: Eiji Sezaki, Yokohama; Yoshikazu Murakami, Yokohama; Shuji Shimada, Fujisawa; Masaaki Saito, Yokohama; Masatoshi Akami, Yokohama; Hisafumi Endo, Yokohama, all of Japan

[73] Assignee: Advanced Elastomer Systems, L. P., St. Louis, Mo.

[21] Appl. No.: 425,521

[22] Filed: Oct. 23, 1989

Related U.S. Application Data

[63] Continuation of Ser. No. 178,451, Apr. 7, 1988, abandoned.

[30] Foreign Application Priority Data

Apr. 7, 1987 [JP] Japan ................................ 62-85530

[51] Int. Cl.$^5$ .............................................. C08L 57/08
[52] U.S. Cl. ................................ 524/526; 524/518; 524/528; 525/194; 525/195; 525/211; 525/232
[58] Field of Search ............... 524/518, 526, 528; 525/194, 211, 232, 195

[56] References Cited

U.S. PATENT DOCUMENTS

| | | | |
|---|---|---|---|
| 3,806,558 | 4/1974 | Fischer | 260/897 |
| 4,130,535 | 12/1978 | Coran et al. | 260/33.6 |
| 4,212,787 | 7/1980 | Matsuda et al. | 260/33.6 |
| 4,391,942 | 7/1983 | Nakauchi et al. | 524/526 |
| 4,626,568 | 12/1986 | Sato et al. | 524/526 |
| 4,728,692 | 3/1988 | Sezaki et al. | 525/74 |
| 4,801,651 | 1/1989 | Komatsu et al. | 525/195 |
| 4,871,796 | 10/1989 | Komatsu | 524/474 |

Primary Examiner—Paul R. Michl
Assistant Examiner—John J. Guarriello
Attorney, Agent, or Firm—Gordon B. Seward; Willaim G. Muller

[57] ABSTRACT

A thermoplastic elastomer composition comprising (A) 10-90 parts by weight of crystalline polypropylene, (B) 10-90 parts by weight of brominated butyl rubber, (C) 10-120 parts by weight of olefinic copolymer rubber to 100 parts by weight of (A)+(B), and (D) 10-150 parts by weight of process oil as plasticizer to 100 parts by weight (A)+(B), all of which are dynamically vulcanized in the presence of a peroxide crosslinking agent.

The thermoplastic elastomer composition of this invention has a high gel ratio or gel content in part because brominated butyl rubber is vulcanized with peroxide. The composition has good elasticity, high mechanical strength, low compressively permanent set, excellent long-term heat stability, moldability, and gas impermeability and high damping characteristic.

5 Claims, No Drawings

THERMOPLASTIC ELASTOMER COMPOSITION

This is a continuation of application Ser. No. 178,451, filed 4/7/88 now abandoned.

BACKGROUND OF THE INVENTION

This invention concerns a thermoplastic elastomer composition which has excellent mechanical strength, thermal stability, moldability, gas-impermeability, and damping characteristics. (Conventional Techniques)

Thermoplastic elastomers are widely used as materials intermediate between rubber and plastics, or as rubber substitutes in automotive parts and others.

Various suggestions have been made traditionally concerning such thermoplastic elastomers. For example, Open Patent No. 1978-34210 discloses a partially-hardened thermoplastic blended material consisting of mono-olefin copolymer rubber and a polyolefin plastic. The mono-olefin copolymer rubber is an elastomer such as ethylene-propylene copolymer (EPM) or ethylene-propylene nonconjugated-diene polymer (EPDM), etc., while the polyolefin plastic is or polyethylene, polypropylene, etc. Partial hardening occurs under dynamic conditions, namely during mastication. Further, Open Patent No. 1979-2662 discloses a method of manufacturing a thermoplastic elastomer which consists of 40–90 parts by weight of mono-olefin copolymer rubber and 60–10 parts by weight of crystalline polypropylene and/or crystalline ethylene-propylene block copolymer, which are mixed and partially vulcanized while the mixture is still molten. In addition, Open Patent Report No. 1980-18448 discloses a thermoplastic elastomer composition which contains about 25–85 parts by weight of crystalline thermoplastic polyolefin resin, about 75-15 parts by weight of a vulcanized mono-olefin copolymer rubber blend, and 0–300 parts by weight of extender oil per 100 parts by weight rubber, and others.

However, compositions consisting of a polyolefin resin and partially vulcanized mono-olefin copolymer rubbers have insufficient moldability and long-term thermal stability, although such characteristics as tensile strength, etc., have been improved. Several suggestions have been made to solve to remaining problems: a thermoplastic elastomer composition consisting of 5–40 wt. % polyisobutylene and/or isobutylene-isoprene copolymer rubber, 30–90 wt. % ethylene-propylene copolymer rubber and/or ethylene-propylene-nonconjugated-diene terpolymer rubber, and 5–40 wt. % of polyolefin resin (Open Patent No. 1979-23702); and a method of manufacturing a partially-vulcanized thermoplastic elastomer composition characterized by dynamic thermal processing, in the presence of organic peroxide, of a mixture consisting of (a) 90–40 parts by weight of peroxide-bridged olefin copolymer, (b) 10–60 parts by weight of peroxide-dissolved olefinic plastic, (where (a)+(b) is 100 parts by weight), (c) a peroxide-unbridged carbohydrate material having a rubbery consistency, and/or (d) 5–100 parts by weight of a process oil type plasticizer (Open Patent No. 1981-15741). Typically, the peroxide-bridged olefin copolymer rubber (a) is ethylene-propylene copolymer rubber or ethylene-propylene-nonconjugated diene copolymer rubber, while peroxide-dissolved olefinic plastic (b) is isotactic polypropylene, and the peroxide-unbridged carbohydrate material having a rubbery consistency (c) is polyisobutylene or butyl rubber.

However, peroxide-bridged olefin copolymer rubber, such as ethylene propylene copolymer rubber and ethylene-propylene-nonconjugated-diene copolymer rubber, are vulcanized in the compositions thus obtained, while polyisobutylene and butyl rubber are not vulcanized; this causes molecular fragmentation. Consequently, these compositions are weak in mechanical strength, inferior in moldability, and have inadequate permanent compressive set and heat resistance.

In light of the above, it has previously been suggested using a thermoplastic elastomer composition which uses a metallic oxide and/or chloride instead of organic peroxide as a bridging agent, and which consists of (A) 10–90 parts by weight of crystalline polypropylene, (B) 10–90 parts by weight of halogenated butyl rubber (where (B)+(B)=100 parts by weight, (C) 10–120 parts by weight of olefin polymer rubber, and (D) 1–90 parts by weight of denatured polyolefin, which are partially vulcanized in the present of a bridging agent consisting of a metallic oxide and/or metallic chloride (Open Patent No. 1986-291639), or a thermoplastic elastomer composition which is partially vulcanized in the presence of a bridging agent made of a metallic oxide and/or a metallic chloride, and which consists of (A) 10–90 parts by weight of crystalline polypropylene, (B) 10–90 parts by weight of halogenated butyl rubber (where (A)+(B)=100 parts by weight, (C) 10–120 parts by weight of olefin polymer rubber, (D) 1–90 parts by weight of denatured polyolefin, and (E) 2–50 parts by weight of nitrile rubber (Open Patent No. 1986-291638). Chlorinated butyl rubber is used in both cases as the halogenated butyl rubber. In such thermoplastic elastomer compositions, only the chlorinated butyl rubber is bridged with ZnO or ZnC12. In order to improve further the mechanical strength and other characteristics, it is necessary to bridge the olefin copolymer rubber such as EPDM, and it becomes necessary to use an organic peroxide in order to accomplish this. However, we have discovered that chlorinated butyl rubber undergoes molecular fragmentation when organic peroxide is used, thereby considerably reducing its mechanical strength, moldability, and plasticity.

Therefore, an objective of this invention is to provide a thermoplastic elastomer composition which has improved mechanical strength, flexibility, moldability, long-term heat resistance, gas impermeability, damping, etc.

A particular objective of this invention is to provide a thermoplastic elastomer composition containing new components consisting of bridged olefin copolymer rubber, in order to improve the above properties.

SUMMARY OF THE INVENTION

A thermoplastic elastomer composition comprising (A) 10–90 parts by weight of crystalline polypropylene, (B) 10–90 parts by weight of brominated butyl rubber, (C) 10–120 parts by weight of olefinic copolymer rubber to 100 parts by weight of (A)+(B), and (D) 10–150 parts by weight of process oil as plasticizer to 100 parts by weight (A)+(B), all of which are dynamically vulcanized in the presence of a peroxide crosslinking agent.

The thermoplastic elastomer composition of this invention has a high gel ratio or gel content in part because brominated butyl rubber is vulcanized with peroxide. The composition has good elasticity, high mechanical strength, low compressive permanent set, excellent long-term heat stability, moldability, and gas impermeability and high damping characteristic. As a consequence of the high damping, it effectively reduces vibration and noise when used in automotive parts. Expansion of its uses can also be expected. As it has an excellent combination of elasticity, strength, and heat resistance, and has good moldability, it can be molded easily by various molding methods, such as injection, blow, and extrusion molding, into automotive parts, such as racks, pinion boots, cable outer-coatings, spoilers, side protectors, bumpers, and other products.

As a consequence of the high damping, the composition effectively reduces vibration and noise when used in automotive parts. As it has an excellent combination of elasticity, strength, and heat resistance, and has good moldability, it can be molded easily various molding methods, such as injection, blow, and extrusion molding, into automotive parts, such as racks, pinion boots, cable outer-coatings, spoilers, side protectors, bumpers, and other products.

DETAILED DESCRIPTION OF THE INVENTION

We discovered that brominated butyl rubber differs from chlorinated butyl rubber, in that the former can be bridged or crosslinked with peroxide without molecular fragmentation, and that a thermoplastic elastomer composition having excellent mechanical strength may be obtained by adding brominated butyl rubber and vulcanizing it with peroxide.

The thermoplastic elastomer composition of this invention comprises of (A) 10-90 parts by weight of crystalline polypropylene, (B) 10-90 parts by weight of brominated butyl rubber, (C) 10-120 parts by weight of olefin copolymer rubber to 100 parts by weight of (A)+(B), and (D) 10-150 parts by weight of process oil as plasticizer to 100 parts by weight of (A)+(B), all of which are dynamically vulcanized in the presence of peroxide as a bridging or crosslinking agent.

The following explains each component of the thermoplastic elastomer composition of this invention.

(A) Crystalline polypropylene

This is propylene homo-polymer, or a copolymer with alpha-olefins such as ethylene, 1-butene, 1-hexene, 4-methyl-1-pentene, etc., having a melt flow rate (hereafter MFR) of 0.3-60 g/10 min., preferably 1-40 g/10 min., and most preferably 3-30 g/10 min., (hereinafter referred to as component A). If it is a copolymer, the propylene content is 60 wt. % or more. "Crystalline polypropylene" as referred to hereinafter, shall include both propylene homopolymer and these copolymers.

Crystalline polypropylene has the highest melting point of all polyolefins, contributing to the improvement of heat resistance and mechanical strength.

Therefore, the content of crystalline polypropylene should be 10-90 parts by weight, preferably 20-70 parts by weight.

(B) Brominated butyl rubber

This refers to brominated isobutylene-isoprene copolymer rubber (hereinafter designated as component B). The bromine content is 0.5 wt. % or more; molecular fragmentation occurs at less than 0.5 wt. %, creating insufficient bridging or crosslinking. The preferred bromine content is 0.5-8 wt. %, and most preferably 0.5-4 wt. %. The desired Mooney viscosity ML1+5 (100° C.) is 25-100, and the degree of unsaturation is 0.5-4.0 mol %.

We have discovered that the bridging characteristics of brominated butyl rubber and chlorinated butyl rubber are quite different, although they are both halogenated butyl rubbers. Namely, while molecular fragmentation occurs in chlorinated butyl rubber with peroxide, making the bridging impossible, brominated butyl rubber can be vulcanized with peroxide without molecular fragmentation. Brominated butyl rubber becomes dispersed as the vulcanized rubber in the composition, contributing to heat resistance, damping, and gas impermeability. The brominated butyl rubber content is 10-90 parts by weight. The above characteristics will not be displayed sufficiently if it is less than 10 parts by weight; if it exceeds 90 parts by weight fluidity decreases, making molding difficult. The preferred content of brominated butyl rubber is 20-70 parts by weight.

(C) Olefin copolymer rubber

This is a copolymer rubber consisting of two, three, or more alpha-olefins such as ethylene, propylene, 1-butene, 1-hexene, 4-methylpentene, etc., (hereafter designated as component C). Typically, it is ethylene-propylene copolymer rubber (EPM) and ethylene-propylene diene copolymer rubber (EPDM). For the diene, nonconjugated dienes such as dicyclopentadiene, 1,4-hexadiene, cyclo-octadiene, methylenenorbornene, ethylidenenorbornene, and conjugated diene such as butadiene and isoprene may be used. EPDM containing nonconjugated diene is particularly preferred.

The ethylene content of the olefin copolymer rubber is preferably 35-88 wt. %, the iodine value (degree of unsaturation) 30 or less, and the Mooney viscosity ML1+5 (127° C.) 5-300.

Olefin copolymer rubber vulcanizes in the presence of peroxide, giving flexibility, and functions as a binder at the interface between polypropylene and brominated butyl rubber. The content of this component should be 10-120 parts by weight, when component (A) plus component (B) is 100 parts by weight. The above-described improvement is insufficient if it is less than 10 parts by weight; conversely fluidity decreases, making molding difficult if it exceeds 120 parts by weight. The preferred content of component (C) is 20-100 parts by weight.

(D) Process oil as plasticizer

Process oil is a high-boiling petroleum fraction, normally used to facilitate processing in milling rubber by weakening intermolecular forces, to facilitate dispersion of carbon black and mineral fillers, and to increase plasticity, flexibility, and moldability by decreasing the hardness of the vulcanized rubber. Process oil may be divided into kinds which contain paraffins, those with naphthenes, and those which are aromatics. The content of process oil as plasticizer in this invention is 10-150 parts by weight when component (A) plus component (B) is 100 parts by weight. The effect is insufficient if it is less than 10 parts-by weight, and the heat resistance and mechanical strength of the composition decreases if it exceeds 150 parts by weight; other adverse effects, such as product damaged in appearance due to plasticizer bleeding may occur. The preferred content of plasticizer is 20-120 parts by weight.

(E) Bridging agent or crosslinking agent

The bridging agent used in this invention is a peroxide. Peroxides include hydroperoxides, dialkyl peroxides, diacyl peroxides, ketoperoxides, peroxyketones, peroxycarbonates, peroxyesters, etc.; more specifically, dicumylperoxide, di-tert-butyl peroxide, 2,5-dimethyl-2,5-di-(tert-butylperoxy)hexane, 2,5-dimethyl-2,5-di(-tert-butylperoxy)hexene-3, 1,3-bis(tertbutylperoxyisopropyl)benzene, 1,1-bis(tert-butylperoxy)-3,3,5-trimethylcyclohexane, n-butyl-4,4-bis(tert-butylperoxy) valerate, benzoyl peroxide, p-chlorobenzoyl peroxide, 2,4-dichlorobenzoyl peroxide, tert-butylperoxy benzoate, tert-butylperoxyisopropylcarbonate, diacetyl peroxide, lauroyl peroxide, tert-butylcumyl peroxide, etc.

In order to sufficiently vulcanize brominated butyl rubber and olefin copolymer rubber, the amount of peroxide to be used is 0.5 parts by weight or more, when the total of components A through D is 100 parts by weight. Excessive amounts result in over vulcanization and decreased fluidity of the composition. Thus, it is preferable to set a maximum limit at 5 parts by weight. The range between 1 and 2 parts by weight is further preferred.

The bridging agent of this invention may contain as a bridging facilitator (also referred to as co-curative, co-agent or accelerator) one, two, or more of the following: sulphur, organic or inorganic sulphides, metallic oxides and chlorides, such as zinc oxide, magnesium oxide, lead monoxide, calcium oxide, zinc chloride, are chlorinated tin, and resins such as alkylphenol, formaldehyde resin, thermo-reactive phenol resin, as well as triarylcyanurate (TAC), triarylisocyanurate (TAIC), ethyleneglycol dimethacrylate (EDMA), trimethylol propane trimethacrylate (TMP), and dioxime of p-quinone (GMF).

There should be a total of 0.5-10 parts by weight of the bridging facilitator to 100 parts by weight of components A through D, preferably 1-5 parts by weight.

(F) Other components

The following may be added in addition as the need arises: antioxidants; ultraviolet ray absorbents; stabilizers, such as agents to prevent metallic deterioration; lubricants; antistatic agents; improvers of electric characteristics; fire-retardants; agents for improving processability; additives, such as coloring agents; and inorganic fillers, such as talc, calcium sulphate, barium sulphate, mica, calcium silicate, etc.

The thermoplastic elastomer of this invention can be manufactured by mixing and dynamically heat-treating the components described above, namely, by melt-mixing them. As for the mixing equipment, any conventional, generally known equipment such as an open-type mixing roll, closed-type Banbury mixer, extruding machine, kneader, continuous mixer, etc., is acceptable. The closed-type is preferable, and mixing in an inactive gas environment, such as nitrogen or carbon dioxide, is also preferable. Mixing and kneading should be done at temperatures in which the half-life period of the organic peroxide used is less than one minute (normally 130°-280° C., preferably 160°-250° C.) for 1-30 minutes, more preferably 5-10 minutes. The preferred method of mixing and kneading the components of this invention is to mix and knead all the components for 1-10 minutes, then to add the bridging agent and other components, and mix again for 1-30 minutes.

The composition obtained using the manufacturing method of this invention can be molded with equipment conventionally used for molding thermoplastics. It is suitable for extrusion molding, calendar molding, and particularly injection molding.

EXAMPLES

This invention will be explained in more detail in the following experimental examples.

EXPERIMENTAL EXAMPLES 1-8

Component A: propylene-ethylene block copolymer ("BJ315" manufactured by Tonen Sekiyukagaku K.K.; density 0.90 g/cc, MFR 15 g/10 min., ethylene content 7%; hereinafter referred to as "PP block").

Component B: brominated butyl rubber ("Bromobutyl 2244" manufactured by Exxon Chemical Japan, Ltd.; Mooney viscosity ML1+5 125° C. 47, bromine content 2 wt. %, degree of unsaturation 2 mol %; hereafter designated as "BrIIR").

Component C: ethylene-propylene-ethylidenenorbornene copolymer ("Vistalon 3777" manufactured by Exxon Chemical Japan, Mooney viscosity ML1+5 127° C. 45, iodine value 18, ethylene content 66 wt. %; hereafter, "EPDM").

Ethylene-propylene copolymer rubber ("Vistalon 457" manufactured by Exxon Chemical Japan, Mooney viscosity ML1+5 127° C. 25, ethylene content 40 wt. %; hereafter, "EPM").

Component D: process oil plasticizer containing a mixture of naphthenes and paraffins ("Flexon 876", manufactured by Exxon Chemical Japan").

Bridging agent: 2,5-dimethyl-2,5-di(t-butyl peroxy)-hexene-3; (hereafter, "peroxide").

Bridging facilitator: ZnO, MgO, and sulphur. PP block, BrIIr, EPDM (EPM), plasticizer, peroxide, and bridging facilitator were mixed in the ratios shown in Table 1 below.

The ratios of all components are represented in parts by weight, while the mixing ratios of EPDM (EPM) and the plasticizer are shown when the total weight of PP block plus BrIIr is considered to be 100 parts by weight, and those of peroxide and bridging facilitator are shown when the total weight of PP block plus BrIIr plus EPDM (EPM) plus plasticizer is considered to be 100 parts by weight.

After mixing, peroxide and bridging facilitator were added in the quantity shown in Table 1, and the entire mixture was further melt-mixed for 3-5 minutes at 175° C. This mixture was then spread to form a sheet, and cut into test pieces; the following tests were then performed.

The experimental procedures were as follows: (1) MLMFR: JIS K7210, load 10 kg, 230° C. (2) ultimate tensile strength, elongation at break: JIS K6301 (3) elastic hardness: JIS K 6301 A type (4) compressive permanent set: JIS K6301, 70° C.×22 hours 25% compression (5) heat resistance: If the ratio of stretch (%) before the heat resistance test to that after the test in a 150° C. oven for 600 hours, was 70%, it was judged excellent (0); 50% or more but less than 70%, acceptable (Δ); and (6) moldability: Based on appearance in blow molding; it was judged "excellent" when the surface was smooth and shiny, with little drawdown; it was "satisfactory" when the surface had minute roughness, with considerable drawdown; it was "unacceptable" if the surface had considerable roughness, with considerable drawdown (7) gel ratio or gel content: this was obtained from the unmelted portion after the test piece was refluxed at 70° C. for 5 hours in n-hexane solvent. In addition, its composition was confirmed from the chacteristics of the infrared absorption spectrum (8) damping characteristic: The test piece was scanned at a frequency of 35 Hz from −150° C. to +150° C. to obtain a tan δ curve; tan δ at 23° C. was taken as the damping characteristic. (Measured with a viscoelasticity meter for solids.) (9) gas permeability: Using a pressure gas-permeation tester, air pressure of 3.5 kg/cm2 was applied to the cell; the amount of gas coming out from the other end was read with a manometer. The results of these tests are shown in Table 1.

COMPARISON EXAMPLES 1-3

Using the same components and procedures as in Experimental Case 1, test pieces of the thermoplastic elastomer composition were manufactured with the components in ratios shown in Table 2 below. The same tests as in Experimental Case 1 were carried out for each test piece. The results are shown in Table 2.

COMPARISON EXAMPLES 4-5

Chlorinated butyl rubber or butyl rubber was used instead of brominated butyl rubber, and the test pieces were manufactured the same way as in Experimental Case 1. The chlorinated butyl rubber and butyl rubber used were as follows:

Chlorinated butyl rubber (ClIIR): "Chlorobutyl 1066" manufactured by Exxon Chemical Japan, Ltd., Mooney viscosity ML1+5 100° C. 50, chlorine content 1 wt. %, degree of unsaturation 2 mol %.

Butyl rubber (IIR): "Exxon butyl 268" manufactured by Exxon Chemical Japan, Ltd., Mooney viscosity ML1+5 125° C. 50.

The same tests were carried out as for Experimental Case 1 for eact test piece. The results are shown in Table 3.

As shown in Tables 1-3, the thermoplastic elastomer composition of this invention containing brominated butyl rubber has excellent heat resistance, moldability, damping characteristic, and gas impermeability.

TABLE 1

| Experimental Examples | No. 1 | 2 | 3 | 4 | 5 | 6 | 7 | 8 |
|---|---|---|---|---|---|---|---|---|
| Components | | | | | | | | |
| PP block | 35 | 60 | 25 | 50 | 55 | 35 | 35 | 70 |
| BrIIR | 65 | 40 | 75 | 50 | 45 | 65 | 65 | 30 |
| EPDM | 35 | 40 | 35 | 80 | (1) 10 | 35 | 100 | 100 |
| Plasticizer | 25 | 25 | 25 | 80 | 80 | 25 | 25 | 25 |
| Peroxide | 1.0 | 1.0 | 1.0 | 1.0 | 1.0 | (2) 1.5 | 1.0 | 1.0 |
| ZnO | 1.5 | 1.5 | 1.5 | 1.5 | 1.5 | 1.5 | 1.5 | 1.5 |
| MgO | 1.5 | 1.5 | 1.5 | 1.5 | 1.5 | 1.5 | 1.5 | 1.5 |
| Sulphur | — | — | — | — | — | — | — | — |
| Characteristics | | | | | | | | |
| MLMFR (g/10 min) | 2.0 | 1.5 | 1.0 | 2.5 | 1.0 | 3.0 | 1.0 | 2.0 |
| Ultimate tensile strength (kg/cm$^2$) | 80 | 100 | 60 | 65 | 70 | 70 | 65 | 130 |
| Elongation at break (%) | 460 | 620 | 350 | 400 | 200 | 430 | 300 | 50 |
| Elastic hardness (JIS A) | 74 | 89 | 60 | 65 | 75 | 74 | 55 | 85 |
| Compressive permanent set (%) | 30 | 60 | 20 | 35 | 35 | 28 | 20 | 65 |
| Gel ratio | | | | | | | | |
| EPDM (%) | 69 | 57 | 72 | 65 | 69 | 69 | 65 | 70 |
| BrIIR (%) | 97 | 94 | 93 | 94 | 97 | 96 | 94 | 97 |
| Heat resistance evaluation | ○ | ○ | ○ | ○ | ○ | ○ | ○ | ○ |
| Moldability evaluation | ○ | ○ | ○ | ○ | ○ | ○ | ○ | ○ |
| Damping characteristic (tan δ) | 0.15 | 0.11 | 0.17 | 0.13 | 0.14 | 0.15 | 0.14 | 0.11 |
| Gas permeability (3) | | | | | | | | |
| (30° C.) | 7.7 | 9.5 | 4.0 | 8.0 | 8.0 | 7.5 | 8.0 | 10 |
| (65° C.) | 41 | 50 | 30 | 42 | 45 | 40 | 43 | 55 |

Notes:
(1) EPM
(2) 2.5-dimethyl-2,5 di(t-butylperoxy)hexane
(3) units [of gas permeability]

TABLE 2

| Comparison Examples | No. 1 | 2 | 3 |
|---|---|---|---|
| Components | | | |
| PP block | 30 | 35 | 20 |
| BrIIR | — | — | — |
| EPDM | 70 | 65 | 80 |
| Plasticizer | 30 | 50 | — |
| Peroxide | 1.0 | — | 1.0 |
| ZnO | 1.5 | — | 1.5 |
| MgO | — | — | — |
| Sulphur | — | 1.3 | — |
| Characteristics | | | |
| MLMFR (g/10 min) | 15 | 20 | 15 |
| Ultimate tensile strength (kg/cm$^2$) | 80 | 80 | 65 |
| Elongation at break (%) | 640 | 550 | 200 |
| Elastic hardness (JIS A) | 71 | 63 | 77 |
| Compressive permanent set (%) | 30 | 25 | 30 |
| Gel ratio | | | |
| EPDM (%) | 50 | 80 | 90 |
| BrIIR (%) | — | — | — |
| Heat resistance evaluation | X | X | X |
| Moldability evaluation | X | X | X |
| Damping characteristic (tan δ) | 0.07 | 0.07 | 0.07 |
| Gas permeability (3) | | | |
| (30° C.) | 30 | 51 | 35 |

TABLE 2-continued

| Comparison Examples | No. | | |
|---|---|---|---|
| | 1 | 2 | 3 |
| (65° C.) | 90 | 160 | 100 |

TABLE 3

| Comparison Examples | No. | |
|---|---|---|
| | 4 | 5 |
| Components | | |
| PP block | 35 | 35 |
| CIIR | 65 | — |
| IIR | — | 65 |
| EPDM | 35 | 35 |
| Plasticizer | 25 | 25 |
| Peroxide | 1.0 | 1.0 |
| ZnO | 1.5 | 1.5 |
| MgO | 1.5 | 1.5 |
| Characteristics | | |
| MLMFR (g/10 min) | 15 | 15 |
| Ultimate tensile strength (kg/cm$^2$) | 40 | 40 |
| Elongation at break (%) | 450 | 470 |
| Elastic hardness (JIS A) | 72 | 72 |
| Compressive permanent set | 50 | 55 |
| Gel ratio | | |
| EPDM (%) | 70 | 70 |
| CIIR (%) | 0 | — |
| IIR (%) | — | 0 |
| Heat resistance | Δ | Δ |
| evaluation | | |
| Moldability evaluation | X | X |
| Damping characteristic (tan δ) | 0.15 | 0.13 |
| Gas permeability (3) | | |
| (30° C.) | 8.5 | 9.0 |
| (65° C.) | 44 | 100 |

What is claimed is:

1. A thermoplastic elastomer composition comprising (A) 10–90 parts by weight of crystalline polypropylene, (B) 10–90 parts by weight of brominated butyl rubber, (C) 10–120 parts by weight of olefinic copolymer rubber to 100 parts by weight of (A)+(B), and (D) 10–150 parts by weight of process oil as plasticizer to 100 parts by weight (A)+(B), all of which are dynamically vulcanized in the presence of a peroxide crosslinking agent.

2. The thermoplastic elastomer composition of claim 1 characterized by the bromine content of the above-described brominated butyl rubber being 0.5 wt. % or more.

3. The thermoplastic elastomer composition of claim 2 characterized by the bromine content of the above-described brominated butyl rubber being 0.5–8 wt. %.

4. The thermoplastic elastomer composition of claim 3 characterized by the bromine content of the above-described brominated butyl rubber being 0.5–4 wt. %.

5. The thermoplastic elastomer of claims 1 or 2 wherein said olefinic copolymer rubber is either ethylene-propylene copolymer rubber or ethylene-propylene-diene copolymer rubber.

* * * * *